Patented Oct. 28, 1952

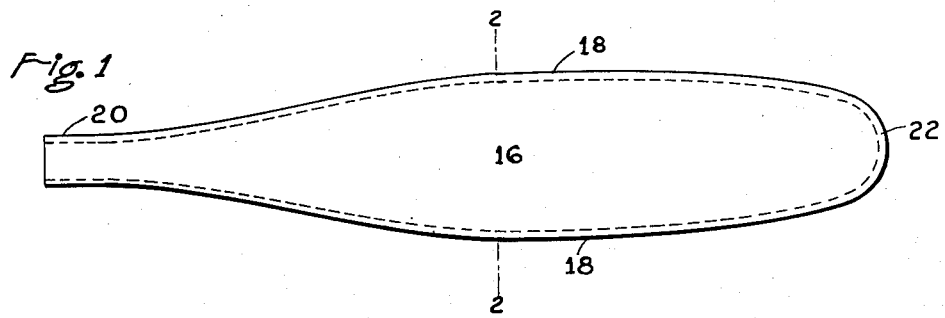
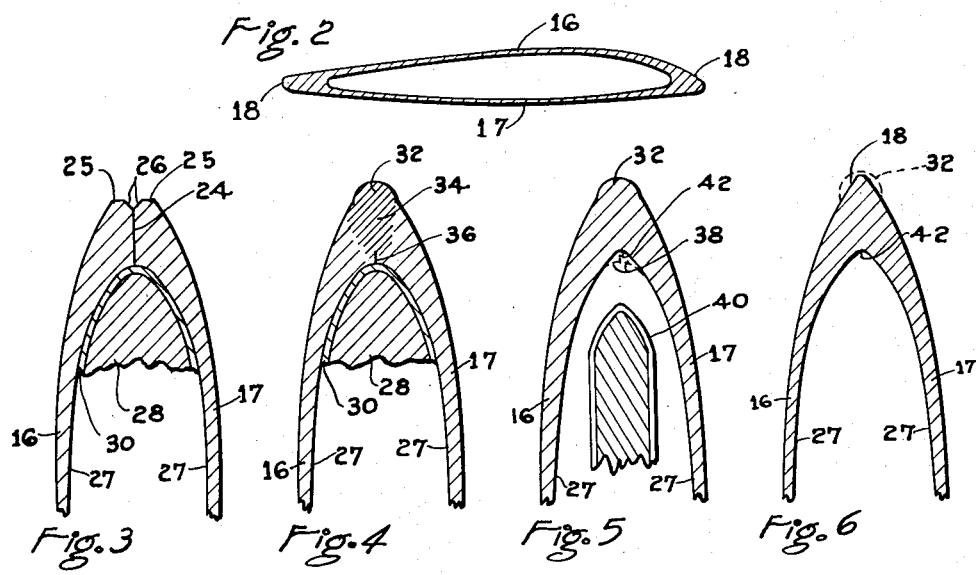
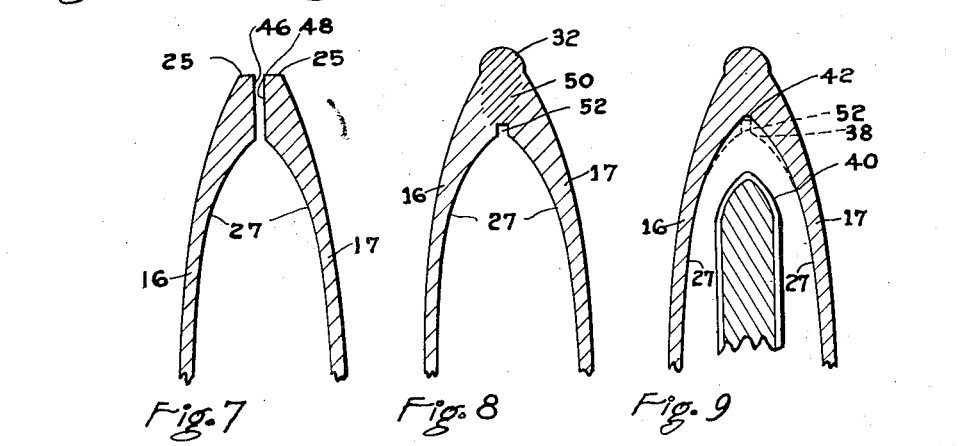

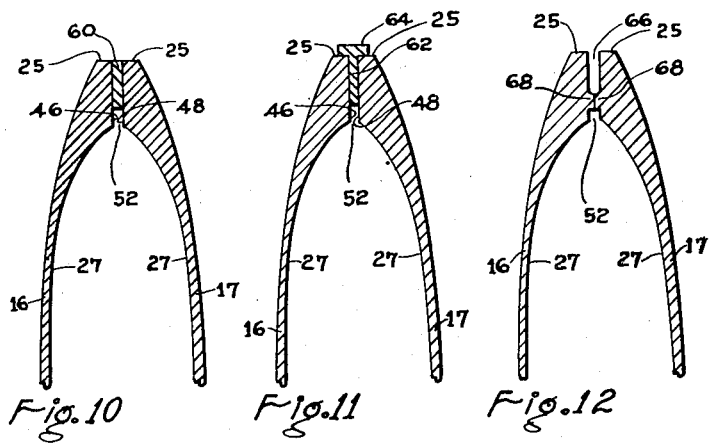
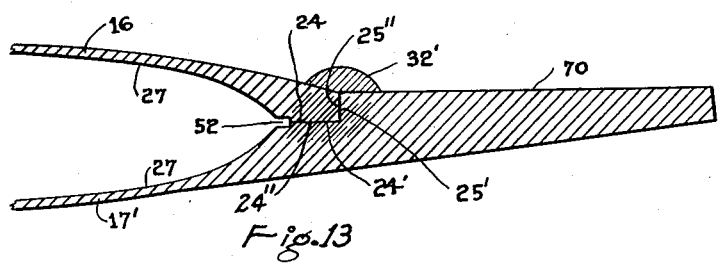
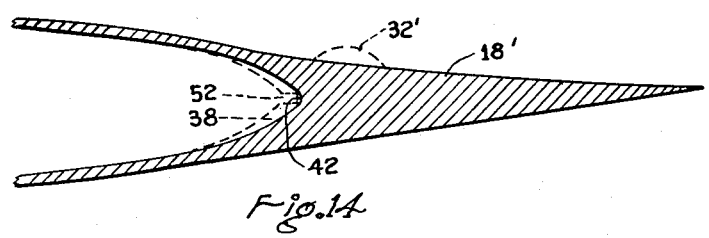

2,615,236

UNITED STATES PATENT OFFICE 2,615,236

BLADE EDGE WELDING TECHNIQUE

Walter H. Stulen, Caldwell, Mathias Klein, Hawthorne, and Edwin L. Tichenor, Montclair, N. J., assignors to Curtiss-Wright Corporation, a corporation of Delaware Application June 27, 1947, Serial No. 757,538

1 Claim. (Cl. 29—156.8)

This invention relates to the joining of metal parts as by welding and is concerned particularly with a joint and a joining method applicable in the fabrication of hollow steel propeller blades and other products. The use of the teachings of the invention assures a strong light weight juncture which is highly resistant to stress due to vibration and other causes.

In general, the invention consists in joining two members along their edges by welding from one side of the members, the weld preferably though not necessarily being of the submerged melt arc type, the welding heat being so controlled as to penetrate nearly through the members. Thus, the edges of the members on the side thereof toward the welding apparatus are firmly joined, while the edges of the members opposite the point of application of welding heat are not fused together, whereby a shallow crack may be left at these edges. After the welding step, the unwelded edges are dressed off by filing, grinding or other machining technique to leave a filleted groove between the members, the groove surface lying in part on the metal fused by welding and in part on the virgin material of the members. Various modifications of the invention are illustrated and described hereafter.

Objects of the invention are:

To provide an improved technique for making a welded joint;

To provide welding and processing steps for joining metallic members which results in a joint having great strength and vibration resistance;

To provide a joining technique wherein the final joint may be held to very close dimensional limits but wherein the forming of the joint permits considerable latitude in variation of the weld, and To provide adjuncts to a welding operation, and a welding technique, which prevent excessive deposition of added weld metal while assuring fully fused joinder of the members.

Other objects of the invention will become apparent in the following description taken in conjunction with the drawings. It is to be expressly understood that the drawings and description are for illustration and explanation only and are not to be construed as defining the limits of the invention, reference being had to the appended claim for this purpose.

In the drawings wherein similar parts are designated by similar reference characters, Fig. 1 is a plan of a completed aeronautical propeller blade built according to the principles of the invention, Fig. 2 is an enlarged section on the line 2—2 of Fig. 1, Figs. 3, 4, 5 and 6 are enlarged fragmentary sections through an edge of the ppropeller blade showing consecutive steps in joining blade forming plates to form a blade leading edge or a blade trailing edge, Figs. 7, 8 and 9 are sections similar to those of Figs. 3 through 6, showing an alternative mode of effecting a blade edge joint, Fig. 10 is an enlarged fragmentary section of a blade edge prepared for welding in an alternative manner, Fig. 11 is an enlarged fragmentary section of a blade edge prepared for welding in another alternative manner, Fig. 12 is an enlarged fragmentary section of a blade edge prepared for welding in still another alternative manner, and Figs. 13 and 14 are enlarged fragmentary sections of edge portions of a blade showing the joining of blade components by another alternative technique.

While a propeller blade is chosen as a product to which the invention is particularly applicable, it will be apparent that the techniques herein described may be used to join members of various forms and for use in other products.

Referring first to Figs. 1 and 2, we show a propeller blade comprising a camber member 16 and a thrust member 17 thickened at their edges and secured as by welding to form leading and trailing edges 18, 18. The members 16 and 17 are formed to a plan form contour such as that shown in Fig. 1, the blade portion proper terminating at one end in a shank 20 preferably of cylindrical form, and terminating at its other end in a tip portion 22. The blade is preferably fabricated by machining or forging a pair of plate members, in a manner well known in the art, so that they taper from relatively thick material at the shank to relatively thin material at the tip. The plate members are also formed with a greater thickness at their leading edge and trailing edge portions than between said edges as is clearly shown in Fig. 2. After preparation of the camber and thrust plates, said plates are machined or formed for mating engagement and are juxtaposed and welded along their edges to form an integral hollow blade structure. Upon completion of the welding and trimming operations, the blade is given final airfoil profile and twist from its shank portion to its tip by heating the blade, embracing the blade in heated forming dies, and in blowing the blade into engagement with the die surfaces by admitting a gas within the blade hollow at high pressure. Thereafter, surface finishing of the blades is completed.

The present invention is concerned with those steps in the entire process of fabricating a propeller blade which deal with the welding of the leading and trailing edges of the blade forming plates to one another. Various techniques have been evolved in the past for accomplishing this critical and difficult operation and presently, automatic submerged arc welding applied to the edges of the juxtaposed blade plates is a preferred technique. The present invention includes particular processing steps for effecting perfect blade edge welds.

Referring now to Figs. 3 through 6, we show one of the methods for the practice of our invention. In Fig. 3, the thickened edges of the camber and thrust plates are machined to provide mating surfaces which are engaged with one another along the line 24, the end surfaces 25 of the plates being formed with chamfers 26 which when the plates are juxtaposed form a groove to receive weld metal. The interior surfaces 27 of the plates are curved and contiguous, and a mandrel 28 is secured against these surfaces and against a layer of refractory material such as glass tape 30, the latter engaging the inner surfaces of the blade plates in the zone of their juncture. The blade plates are set up in suitable fixtures, known to the art, by which they are held in the proper position with respect to each other during the welding operation.

Fig. 4 shows the plates after a weld has been accomplished, the closely hatched bead 32 and edge portion 34 representing respectively added weld metal and virgin plate metal which has been fused into an integral whole by the application of welding heat. Heat penetration and weld metal addition may be precisely controlled, particularly in the submerged melt welding method, so that only a moderate amount of weld metal need be added, while considerable heat penetration may be attained to produce the submerged weld nuggets 34. In the preferred practice of the invention, heat penetration is controlled so that molten metal does not pass beyond the innermost portions of the plate edges. Consequently, with a tolerance in weld control, the edges may be welded, or may not be welded and may have a shallow crack as at 36 between the matching faces of the plates 16 and 17 but in any event leaving the inner surfaces of the blade plates free from the addition of weld metal. The crack 36 may extend from a relatively minute depth to a depth of possibly $\frac{1}{16}$ of an inch. This dimension is merely exemplary and is variable according to the kind of material being welded, the nature of the product, the precision of the welding control, and the thickness of material involved.

After completion of the weld, the mandrel 28 and the refractory 30 are removed from the embryo product and the innermost portions of the blade material embracing and adjacent the parting 36, such as at 38 in Fig. 5, are removed by filing, grinding, or other appropriate machining process. As an example, the portions 38 may be removed by a reciprocating file 40 to form a groove 42 whose deepest portion is in the weld nugget (34 Fig. 4) and whose lateral portions are in the inner surfaces 27 of the virgin material of the plates 16 and 17. The filing or machining is carried to a depth such that the crack (36 Fig. 4) is entirely eliminated so that a smooth rounded fillet becomes the final profile of the groove 42. Machining or filing as above described can be carried out expeditiously and can be controlled to secure a precise depth of cut. In the production utilization of the teachings of the invention, it is expected that tolerances would be set up for the depth of the crack 36 from substantially zero to, for instance, $\frac{1}{16}$ of an inch. Likewise, a depth would be set up for the groove 42 which would be of the order of $\frac{1}{16}$ plus .015 inch. Thus, if the groove depth is at all times over the maximum tolerable depth of the crack 36, the finished joint between the plates 16 and 17 will always be an integral whole, free from incipient cracks or other faults. If the crack depth were something less than the maximum limiting depth, the file or cutter 40 would merely remove some portion of welded material but the final product would be very closely held to the desired dimensional limits.

Particularly in the manufacture of propeller blades, close adherence to dimensional limits of the blade members is essential in order to attain uniformity of product and correct balance of the blades when they are installed in a propeller.

Fig. 6 represents the final external finishing of the blade edge, the weld bead 32 being dressed off to form a properly profiled leading or trailing edge 18.

Figs. 7, 8 and 9 illustrate an alternative mode of practicing the invention. In Fig. 7 the blade plates 16 and 17, substantially the same as those previously described, are juxtaposed with facing surfaces 46 and 48 in substantially spaced parallel relationship. Suitable mandrels are installed within the blade assembly as previously described and the blade plates are secured in a suitable fixture. The spaced plate edges are then subjected to the welding operation, the weld rod feed and heat being so controlled as to add weld metal to the space between the surfaces 46 and 48 as at 50, and to add the weld bead 32 on the outer edges of the plates. The welding control is likewise arranged so that weld metal penetration between the faces 46 and 48 reaches almost, but not quite, to the inner surfaces 27 of the blade plates, leaving a substantially rectangular groove 52 (Fig. 8) within the blade, bordered on its bottom by weld metal and on its sides by the virgin material of the plates 16 and 17. The blade assembly is then removed from the welding fixture and the filing or machining operation similar to that described in connection with Fig. 5 is accomplished. In this instance however, the rectangular groove 52 provides a piloting guide for the file or cutter 40 as the latter is reciprocated, assuring symmetrical metal removal on either side of the plane of symmetry of the welded joint. The final joint, represented by solid lines in Fig. 9, includes a machined groove 42 similar to that described in connection with Fig. 5, said groove being symmetrically disposed between the plates 16 and 17 by virtue of the file or cutter guidance afforded by the initial rectangular groove 52. The subsequent step of finishing the edge 18, in the embodiment of Figs. 7 to 9, is similar to that described in connection with Fig. 6.

In Fig. 10, which shows the blade plates 16 and 17 set up for the welding operation, the plates are spaced apart as in Fig. 7, but a small filler strip 60, of material similar to that of the blade plates, is inserted between the facing surfaces 46 and 48 to hold them in spaced relation. With this arrangement, the plates can be clamped firmly against the filler strip 60, said strip being located so that its outer edge is substantially flush with the edges 25 and so that its inner edge forms the bottom of the rectangular groove 52 which is used later to pilot a cutter. After the assembly is made, the welding operation is accomplished, the welding controls being so adjusted as to add the weld bead such as 32 in Fig. 8, and to effect a depth of weld penetration so that the filler strip 60 and the contacting surfaces 46 and 48 of the blade plates are fused into an integral weld nugget. In this arrangement, the strip 60 provides a determinate depth for the groove 52 and constitutes an improvement over the arrangement of Fig. 7. In the Fig. 7 arrangement, the depth of the groove 52 may vary considerably due to lack of precise controllability for the depth of flow of the weld metal as it is added to the space between the blade plates. After completion of the weld in the arrangement of Fig. 10, the same procedures are followed as have been previously described, with respect to filing a smooth filleted groove 42 whose bottom surface penetrates the weld metal and whose lateral surfaces are formed by the plate material.

Fig. 11 shows a setup ready for welding, somewhat similar to that of Fig. 10. However, the filler strip comprises a T-shaped member including a stem 62 inserted between the opposed faces 46 and 48 of the blade plates, and a head 64 engaging the outer surfaces 25 of the blade plates. The head of the T, bearing upon the outer surfaces of the blade plates, provides a positive location for the filler strip so that the depth of the rectangular groove 52 becomes wholly determinate. In the welding step, following the setup shown in Fig. 11, the filler strip, including the stem 62 and the head 64, is fused to the blade plates, forming a weld nugget and bead similar to the arrangements 50 and 32 shown in Fig. 8. With the Fig. 11 arrangement the amount of weld metal added is relatively small but the amount of welding heat to which the joint is subjected to form a perfect assembly, is of the same order as that required to form the previously described types of joints. Finishing of the groove and weld bead by filing and dressing is conducted in a manner similar to that previously described.

In Fig. 12, the facing plate surfaces are formed with integral machined projections 68 which are abutted against one another in the weld setup, leaving a rectangular groove 52 such as has been described before adjacent the inner faces 27 of the blade plates, and leaving an external groove 66 between the outer portions of the plate edges. In the welding operation, weld metal is added to the groove 66, the controls being adjusted to afford sufficient weld penetration so that the mating surfaces of the projections 68 are fused together. Upon weld completion, finishing steps for the groove and weld bead are carried out as previously described.

Figs. 13 and 14 show an application of the principles of the invention to a slightly different propeller blade organization wherein the camber plate 16 is formed substantially in the same manner as heretofore covered but wherein the thrust plate 17' includes an integral blank for a trailing or leading edge extension 70. The thrust plate 17' is provided with an initial machined cutout providing surfaces 24' and 25' respectively matching with the surfaces 24'' and 25'' of the camber member 16 the surfaces 24' and 24'' contacting along the line 24. The plates are likewise machined with shallow grooves adjacent the edges of their inner surfaces 27 so that when assembled upon one another, an internal file-guiding groove 52 is formed between the plates.

Weld metal and welding heat are applied along the parting between the surfaces 25 and 25' to build up a weld bead 32'. Welding heat is applied with sufficient intensity to fuse the plates 16 and 17' to one another along the parting surfaces 24, 24', and 25, 25', the densely hatched portion of the arrangement of Fig. 13 showing the approximate coverage of the weld nugget after the welding step is accomplished. Fig. 13 is a composite section, showing the arrangement of the elements prior to welding and also showing the disposition of the weld bead and weld nugget after they are welded. When the weld is accomplished, the lines representing the parting surfaces 24, 24', 25 and 25' are eliminated by the weld nugget. Upon completion of the welding step, the blade structure is then finished by machining off the weld bead 32' and by machining or filing the interior curved fillet 42 within the blade assembly, in the same manner as has been described previously. The full lines of Fig. 14 represent the final profile of the blade edge portion wherein the extension blank 70 is machined to form a blade edge extension 18' extending a considerable distance, as solid metal, beyond the juncture of the camber and thrust plates proper of the blade.

Those skilled in the art will appreciate that many changes and modifications may be made in the techniques outlined either in the fabrication of propeller blades or for the fabrication of other metallic parts to which the principles of this invention are applicable. It is to be understood that such modifications and changes are deemed to come within the scope of the invention.

Though several embodiments illustrating the invention have been shown and described, it is to be understood that the invention may be applied in other and various forms. Changes may be made in the arrangements, without departing from the spirit of the invention. Reference should be had to the appended claim for definitions of the limits of the invention.

What is claimed is:

A method of joining two acutely angled metallic members edge to edge, which consists in preparting the edges of the members by grooving an inside edge corner of each, assembling the members in edge-to-edge relation so that the inside corner grooves in each member cooperate to form a larger groove, welding said members along said edges from the sides thereof opposite the sides carying said corner grooves to a depth substantially reaching the bottom face of said larger groove, and then moving a cutting tool along the sides of said members containing said groove and piloting the cutting tool in said groove to enlarge and deepen said groove until the cutting tool enters into the welded metal joining said members.

WALTER H. STULEN.
MATHIAS KLEIN.
EDWIN L. TICHENOR.

REFERENCES CITED

The following references are of record in the file of this patent:

UNITED STATES PATENTS

| Number | Name | Date |
|---|---|---|
| 1,980,561 | Wagner | Nov. 13, 1934 |
| 1,952,955 | Trageser et al. | Mar. 27, 1934 |
| 1,992,338 | Whitworth | Feb. 26, 1935 |
| 2,145,937 | Lockwood | Feb. 7, 1939 |
| 2,177,868 | Chapman | Oct. 31, 1939 |
| 2,184,560 | Moss | Dec. 26, 1939 |
| 2,214,338 | McKee | Sept. 10, 1940 |
| 2,224,145 | Dugan et al. | Dec. 10, 1940 |
| 2,231,888 | Couch | Feb. 18, 1941 |
| 2,249,723 | Orr | July 15, 1941 |
| 2,263,272 | Moss | Nov. 18, 1941 |
| 2,308,344 | Andrake | Jan. 12, 1943 |
| 2,362,505 | Smith | Nov. 14, 1944 |
| 2,392,281 | Allen | Jan. 1, 1946 |
| 2,467,371 | Hudson | Apr. 12, 1949 |

OTHER REFERENCES

The Weld. Ency., 10th ed., copyright 1941, pub. by The Weld. Eng. Pub. Co., Chicago, Ill. Copy in Div. 14.